US006633482B2

(12) United States Patent
Rode

(10) Patent No.: US 6,633,482 B2
(45) Date of Patent: Oct. 14, 2003

(54) SYSTEM FOR ADAPTING DRIVER INFORMATION SYSTEMS TO EXISTING VEHICLES

(75) Inventor: Melvin A. Rode, Independence Township, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 137 days.

(21) Appl. No.: 09/832,079

(22) Filed: Apr. 10, 2001

(65) Prior Publication Data

US 2001/0045774 A1 Nov. 29, 2001

Related U.S. Application Data

(60) Provisional application No. 60/269,288, filed on Feb. 16, 2001, and provisional application No. 60/200,748, filed on May 1, 2000.

(51) Int. Cl.$^7$ .............................. H05K 7/10; H04Q 7/32
(52) U.S. Cl. ...................... 361/686; 361/727; 455/90; 439/945
(58) Field of Search ................................ 361/679–686, 361/727; 701/200; 455/90; 439/377, 929, 945

(56) References Cited

U.S. PATENT DOCUMENTS

| 5,414,770 A | * | 5/1995 | Wang ........................ 379/446 |
| 5,888,087 A | * | 3/1999 | Hanson et al. .............. 439/374 |
| 6,042,414 A | * | 3/2000 | Kunert ....................... 439/374 |
| 6,138,041 A | * | 10/2000 | Yahia ......................... 455/569 |
| 6,341,218 B1 | * | 1/2002 | Poplawsky et al. .......... 455/90 |

* cited by examiner

Primary Examiner—Jayprakash N. Gandhi

(57) ABSTRACT

A system for installing an interactive driver information system into an existing vehicle is disclosed. An off-the-shelf driver-to-vehicle interface device such as a PDA is received in a corresponding docking station. A custom adapter device mechanically and electrically receives the PDA components and enables a mechanical and electrical connection from the PDA components to the vehicle. The custom adapter device is configured in a variety of embodiments to interfit with a pre-existing cavity in the vehicle such as a cup holder, ashtray cavity, coin holder, or seam in the dashboard. The custom adapter device further provides an electrical connection from the PDA components to the power system of the vehicle and to an electronic on board controller. The PDA docking station may be structurally integrated with a microphone, a speaker, and a control panel of manually operable elements to be manipulated by a driver.

17 Claims, 4 Drawing Sheets

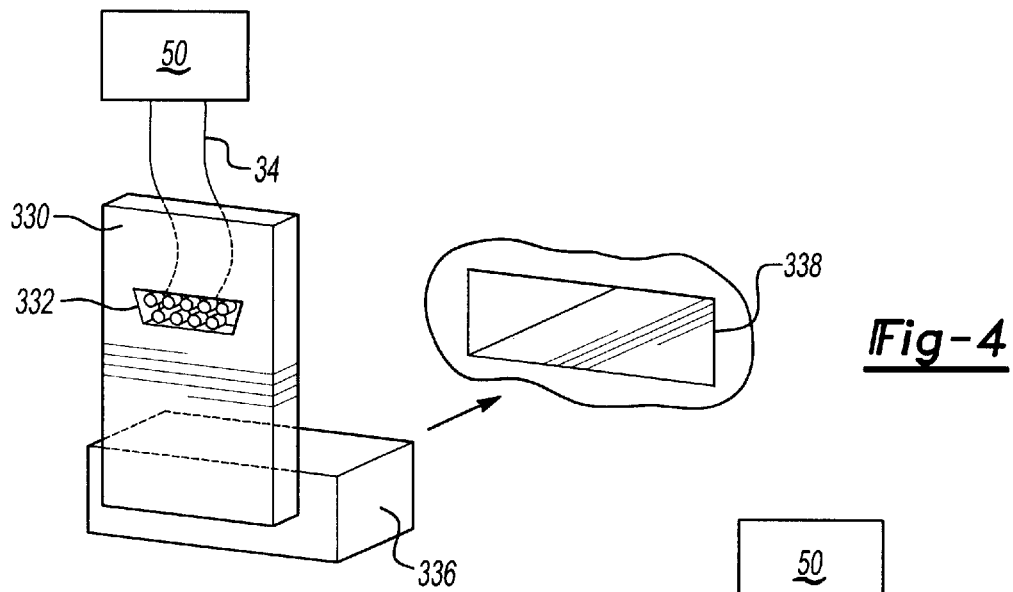
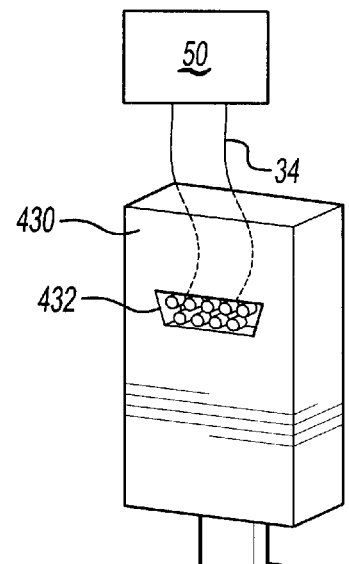
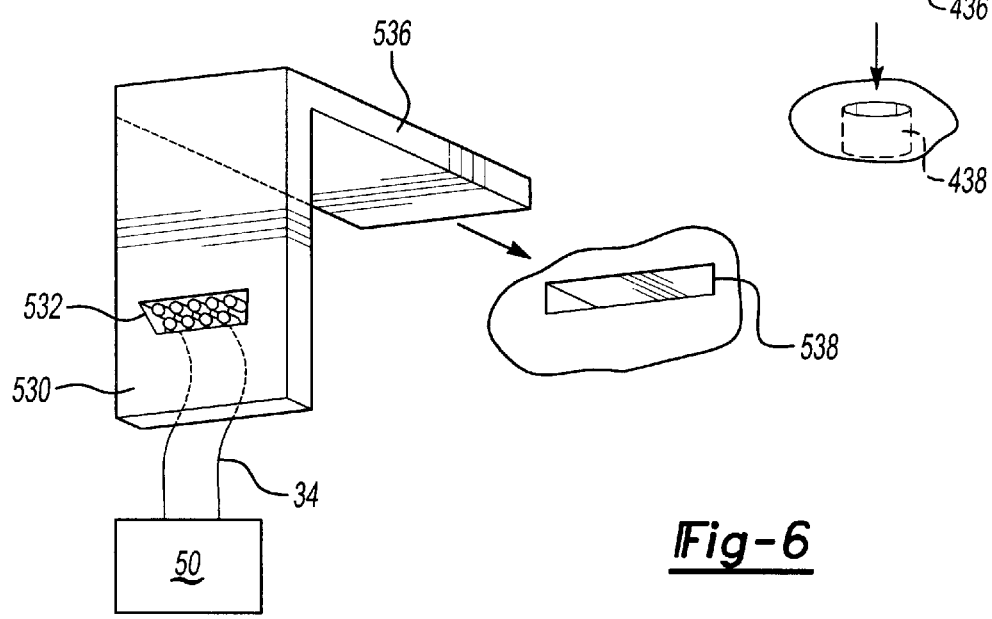

SYSTEM FOR ADAPTING DRIVER INFORMATION SYSTEMS TO EXISTING VEHICLES

This application claims priority to Provisional Patent Application Ser. No. 60/200,748, filed May 1, 2000, and Provisional Patent Application Ser. No. 60/269,288, filed Feb. 16, 2001.

BACKGROUND OF THE INVENTION

This invention relates to a system for manually and electrically installing interactive driver information systems into existing vehicles.

The use of interactive driver information systems in vehicles is becoming increasingly prevalent. Typically, an interactive driver-to-vehicle interface involves a visible display capable of alphanumeric characters, icons, and possibly graphics such as simple maps and a driver input device such as a simple keypad and/or a device to scroll through informational menus. It is necessary for the interactive driver-to-vehicle interface to be positioned in a vehicle so that it is easily accessible to the driver in terms of both hand manipulation and visibility.

Existing arrangements for the installation of an interactive driver information system within a vehicle involve the use of large brackets and/or goosenecks of various types to connect the interactive driver information system to an instrument panel, dashboard, center console, or the floor. Further, the interactive driver information system typically operates using several separate parts that are installed in various locations within the vehicle and are cabled together. Generally these factors result in an interactive driver information system that is aesthetically unpleasing as well as difficult and expensive to install.

It would be desirable to provide a system for the installation of an interactive driver information system that is aesthetically pleasing as well as economical and easy to install in existing vehicles while at the same time allows for optimum accessibility to the vehicle driver and affords quick and easy removal from the vehicle.

SUMMARY OF THE INVENTION

In the disclosed embodiment of this invention, and installation system for an off-the-shelf interactive driver-to-vehicle interface device such as a PDA is provided to an existing vehicle. The installation system of the present invention uses pre-installed driver convenience devices such as cup holders, ashtrays, CD compartments, coin holders and other element receiving devices. The off-the-shelf interface device or PDA operates normally as known with its accompanying off-the-shelf PDA docking station. A custom adapter device is then provided which mechanically receives the docking station and further interfits with a pre-existing element receiving device in the vehicle. The custom adapter device is removably secured to the pre-installed element receiving device by any conventional simple securing member such as a screw, a pop rivet or even some type of adhesive such as Velcro.

The custom adapter device is further equipped with a mechanism for electrically receiving and communicating with the docking station and communicating electronically with the vehicle's on board electronic system. This is accomplished by providing the custom adapter device with a suitable electronic port for electronically connecting to the docking station as well as an electric cable that electronically connects to the vehicle's on board electronic system which includes a power system, a grounding system, a sensing system and communication devices. The vehicle's electronic system forms the on board part of the driver information system and may include a plurality of individual components electronically connected by way of a plurality of cables or, a simpler system where individual components are integrated so that fewer elements are electronically connected by way of fewer cables. The signal lines to the docking station could also be replaced by a short range radio frequency link such as is provided by a "Bluetooth" device. One appropriate device is available from Ericsson.

Thus a driver information installation system is provided that affords ease of installation and use, is aesthetically pleasing as it requires no large brackets or gooseneck devices, and is economical as on board electronic components may be integrated requiring fewer elements and therefore fewer cables.

In an embodiment of a docking station, the docking station may be structurally integrated with a microphone, a speaker and a control panel of manually operable elements to be manipulated by a driver. This docking station can be used either with the other aspects of this invention, or independently.

These and other features of the present invention can be understood from the following specification and drawings, the following of which is a brief description.

BRIEF DESCRIPTION OF THE DRAWINGS

FIG. 4 is a schematic view of a fourth embodiment of the custom adapter device of the present invention.

FIG. 5 is a schematic view of a fifth embodiment of the custom adapter device of the present invention.

FIG. 6 is a schematic view of a sixth embodiment of the custom adapter device of the present invention.

DETAILED DESCRIPTION OF THE DRAWINGS

Figure 1:
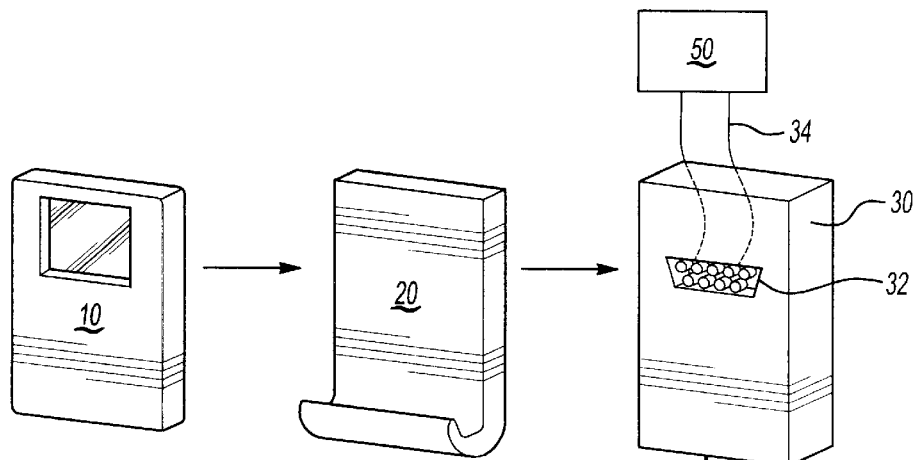
FIG. 1 is a schematic view of the driver-to-vehicle interface elements of the interactive driver information installation system utilizing a first embodiment of the custom adapter device of the present invention.

As shown schematically in FIG. 1, the driver-to-vehicle interface elements of the interactive driver information installation system generally comprise off-the-shelf interface device such as a PDA 10, corresponding docking station 20, and custom adapter device 30. PDA 10 and corresponding docking station 20 electronically and mechanically connect in a known manner. Docking station 20 is then mechanically and electronically received by custom adapter device 30, which is configured to receive docking station 20 by way of connector 32. A cable 34 completes the connection from custom device 30 to the vehicle's on board electronic system 50. That is, the cable 34 connects the custom adapter device 30 to the vehicle's computer, such that the PDA can interact with the vehicle's computer.

Custom adapter device 30 is further configured to be received within a preexisting element holding device or cavity in the vehicle. In this embodiment, custom adapter device 30 is provided with extension 36 which is configured to be fittingly received in a standard, pre-existing cup holder 38 by a conventional fastening device 40 such as a single screw or pop rivet.

Figure 2:
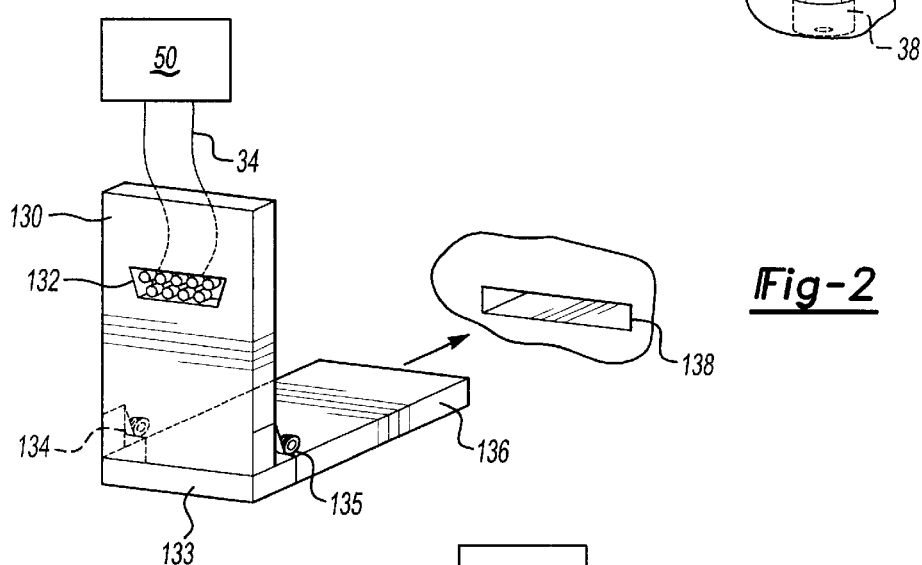
FIG. 2 is a schematic view of a second embodiment of the custom adapter device of the present invention.

FIG. 2 schematically shows a second embodiment of custom adapter device 130 including docking station connector 132. In this embodiment, custom adapter device 130 is provided with extension 136, which is configured to be fittingly received in a pre-existing retractable cup holder slot 138. Extension 136 is hingedly connected to custom adapter device 130 by way of hinge 133 and springs 134, 135.

Figure 3:
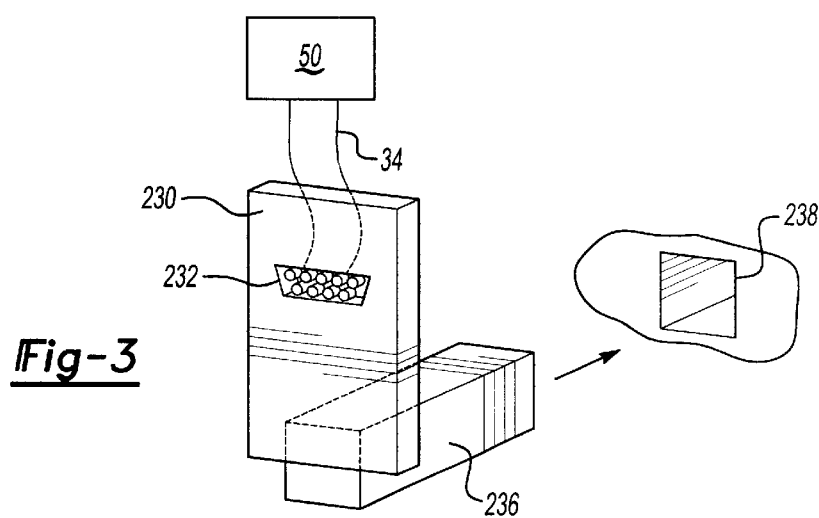
FIG. 3 is a schematic view of a third embodiment of the custom adapter device of the present invention.

FIG. 3 schematically shows custom adapter device 230 including docking station connector 232. In this embodiment custom adapter device 230 is provided with extension 236, which is configured to be fittingly received in a pre-existing ash tray cavity 238.

FIG. 4 schematically shows custom adapter device 330 including docking station connector 332. In this embodiment custom adapter device 330 is provided with extension 336, which is configured to be fittingly received in a pre-existing DIN slot 338.

FIG. 5 schematically shows custom adapter device 430 including docking station connector 432. In this embodiment custom adapter device 430 is provided with extension 436, which is configured to be fittingly received in a pre-existing coin holder cavity 438.

FIG. 6 schematically shows custom adapter device 530 including docking station connector 532. In this embodiment custom adapter device 530 is provided with extension 536, which is configured to be fittingly received in a pre-existing seam in instrument panel or dashboard 538.

Figure 6A:
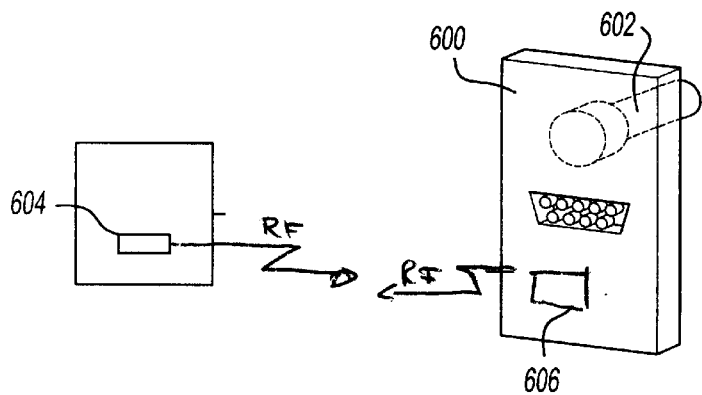
FIG. 6A shows an alternative.

As shown in FIG. 6A, the signal lines could be replaced by short range radio frequency link. If the custom adapter 600 mechanically plugs into some device 602 already powered by the vehicle electrical system, such as cigarette lighter, no cabling is needed for the docking station. Bluetooth RF devices 604, 606 can communicate signals. This type of communication can be used in any of the embodiments under this application. Preferably, only signals are transmitted over the RF link. Power is preferably delivered directly such as by device 602.

Figure 7:
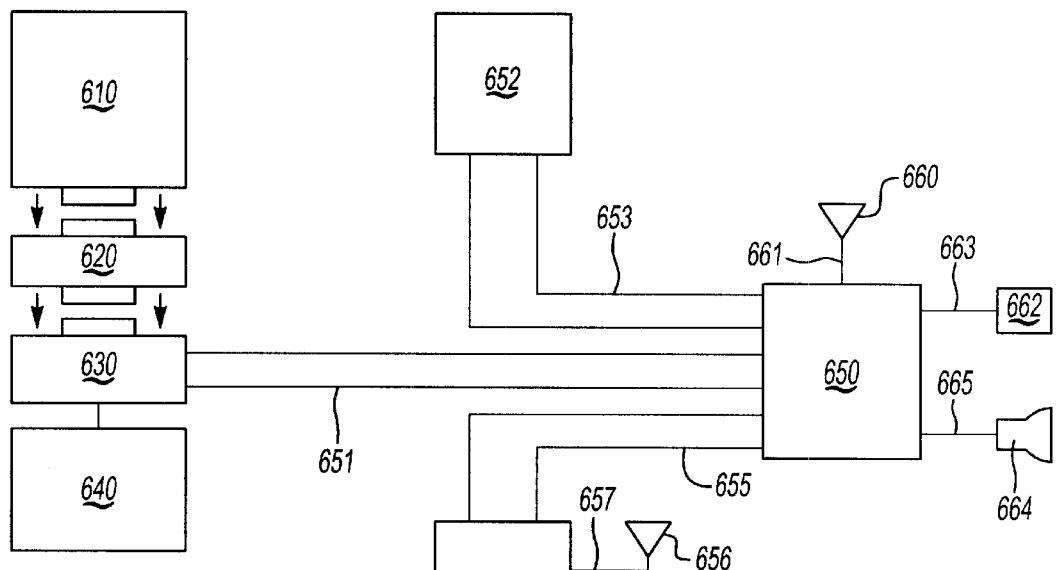
FIG. 7 is a schematic view of the on board elements of the interactive driver information installation system of the present invention.

FIG. 7 shows a schematic view of the on board elements of the inventive driver information system. PDA 610 mechanically and electronically connects to docking station 620 which further connects to custom adapter device 630 as previously described. Custom adapter device 630 enables an electronic connection to the vehicle's power system 640 and to the on board controller 650, or on board computer. Cable 651 connects controller 650 to custom adapter device 630. A driver input device 652, which may be a scroll or keypad device, is electronically connected to controller 650 by cable 653. A data phone 654 is connected to controller 650 by cable 655. Antenna 656 and microphone 658 are connected to data phone 654 by way of cables 657 and 659, respectively. Controller 650 further has cabled connections to GPS antenna 660, heading sensor 662 and speaker 664 by way of cables 661, 663 and 665, respectively. This system is formed by a plurality of various elements interconnected by a plurality of various cables. This is a typical installation for OEM applications where the vehicle is pre-wired for the system.

Figure 8:
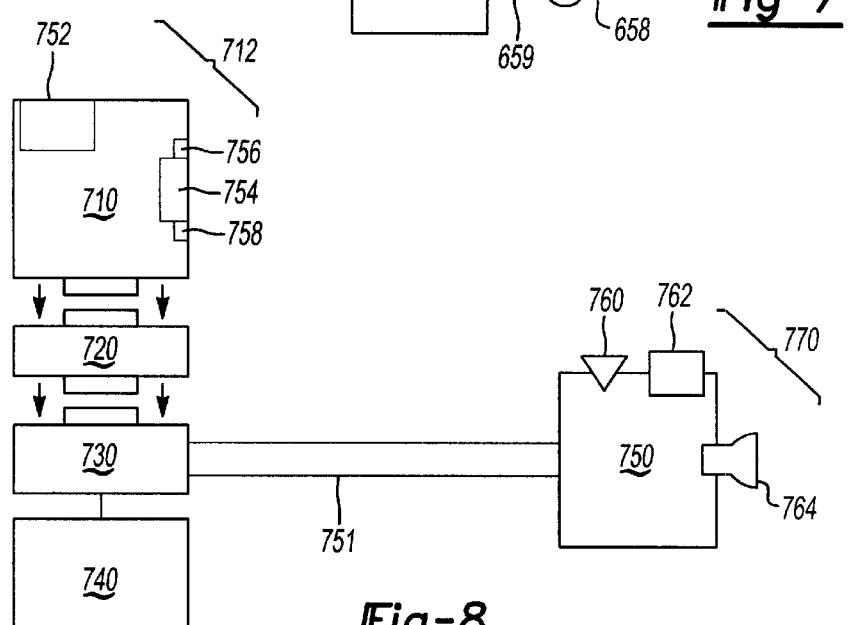
FIG. 8 is a schematic view of the on board elements of the interactive driver information installation system of the present invention whereby the components are optimally integrated.

FIG. 8 schematically shows an optimally integrated embodiment of the on board elements of the inventive driver information installation system. In this embodiment the driver input is accomplished using the built in PDA input elements 752. The PDA 710 and the data phone 754 along with its corresponding antenna 756 and microphone 758 are integrated into a single PDA/driver input/data phone component 712, which connects to docking station 720, which further connects to custom adapter device 730 as previously described. Custom adapter device 730 enables an electronic connection to the vehicle's power system 740. The GPS antenna 760, heading sensor 762 and speaker 764 are all integrated with the on board controller 750, or on board computer, forming integrated controller component 770 which connects to custom adapter device 730 by way of cable 751. Thus, interconnection of the system depicted in this embodiment requires only one cable. This greatly simplifies installation.

Further, the size of integrated controller component 770 is reduced sufficiently so that integrated controller component 770 can be mounted on the windshield behind the rearview mirror or on the front center of the dash board to ensure that the GPS antenna 760 and the heading sensor 762 operate properly. The installation system in FIG. 8 becomes much simpler, less costly, and more reliable than the more conventional system shown in FIG. 7. It should be noted that there are various incremental steps between the embodiments shown in FIG. 7 and FIG. 8 that can be used. For example, the data phone could be a separate component from the PDA, but the GPS antenna, heading sensor and speaker could still be integrated into the controller.

Figure 9:
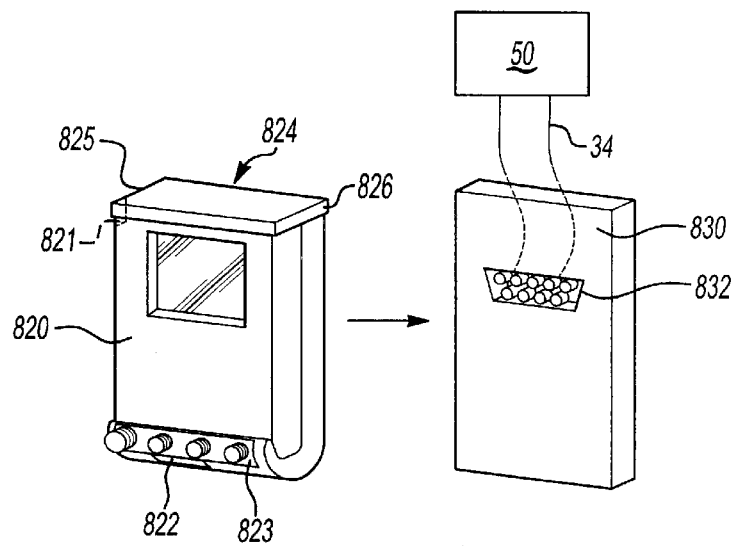
FIG. 9 is a schematic view of another embodiment of the docking station of the interactive driver information station.

FIG. 9 schematically shows another embodiment of the docking station 820 which may be electronically and mechanically received by any of the custom adapter devices described in FIGS. 1–6 and shown generally at 830. Custom adapter device 830 is configured to receive docking station 820 by way of connector 832. Docking station 820 incorporates a microphone 821, a speaker 822 and a control panel 823 of manually operable control elements including buttons and a knob for the driver to manipulate. A retaining device 824 is pivotally attached to docking station 820 at laterally spaced ends 825, 826, and serves to maintain the interface device or PDA securely in position.

Figure 10:
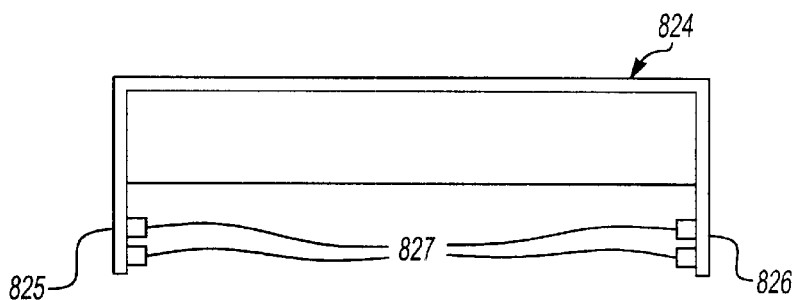
FIG. 10 is a view of an element of the docking station in FIG. 9.

FIG. 10 shows an opened view of retaining device 824. Laterally spaced ends 825 and 826 of retaining device 824 are provided with a system of detents 827 to provide an incrementally pivoting connection to the docking station so that the retaining device 824 may be held securely in an opened or closed position as desired.

Figure 11:
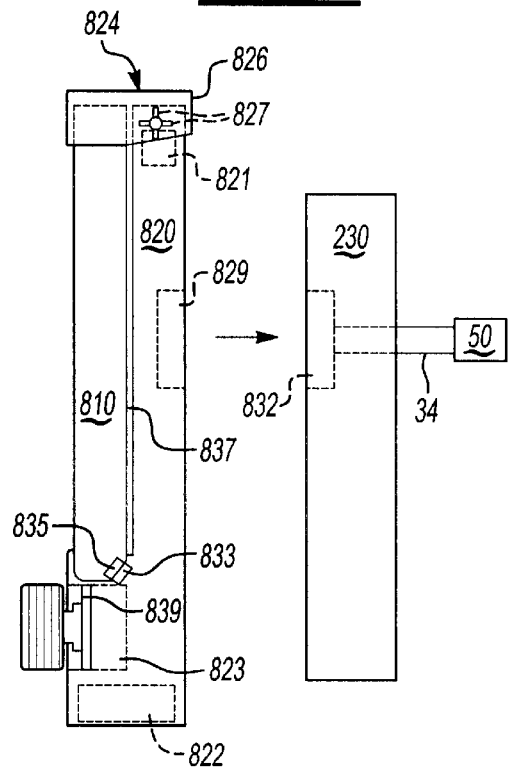
FIG. 11 is a schematic side view of the docking station shown in FIG. 9.

FIG. 11 schematically shows a side view of docking station 820 including PDA 810 held securely in position using retaining device 824. Also shown are microphone 821, speaker 822, and control panel 823 to enable manual control. A PC board for a charger and other miscellaneous functions is shown at 837. A PC board for knob and button elements on control panel 823 is shown at 839. The system of detents 827 is shown at lateral end 826. Connector 829 is shown which allows docking station 820 to be connected to custom adapter device generally shown at 830 by way of connector 832. Docking station 820 further includes connector 833 which mates with corresponding connector 835 on PDA 810.

A preferred embodiment of this invention has been disclosed, however, a worker in this art would recognize that certain modifications would come within the scope of this invention. For that reason, the following claims should be studied to determine the true scope and content of this invention.

What is claimed is:

1. A system for installing an interactive driver information system into an existing vehicle comprising:
   a PDA,
   a corresponding PDA docking station for mechanically and electrically receiving said PDA, and
   a custom adapter device for mechanically and electrically receiving said PDA received in said docking station said custom adapter device creating end maintaining a mechanical and providing an electrical data connection from said PDA received in said docking station to said vehicle.

2. A system for installing an interactive driver information system into an existing vehicle as recited in claim 1 wherein said custom adapter device is configured to be fittingly received within a pre-existing cavity in said vehicle.

3. A system for installing an interactive driver information system into an existing vehicle as recited in claim 2 wherein said pre-existing cavity is a cup holder and said custom adapter device is provided with an extension that is configured to be fittingly received in said cup holder.

4. A system for installing an interactive driver information system into an existing vehicle as recited in claim 2 wherein said pre-existing cavity is a retractable cup holder slot and said custom adapter device is provided with a hingedly connected extension that is configured to be fittingly received in said retractable cup holder slot.

5. A system for installing an interactive driver information system into an existing vehicle as recited in claim 2 wherein said pre-existing cavity is an ash tray cavity and said custom adapter device is provided with an extension that is configured to be fittingly received in said ash tray cavity.

6. A system for installing an interactive driver information system into an existing vehicle as recited in claim 2 wherein said pre-existing cavity is a DIN slot and said custom adapter device is provided with an extension that is configured to be fittingly received in said DIN slot.

7. A system for installing an interactive driver information system into an existing vehicle as recited in claim 2 wherein said pre-existing cavity is a coin holder cavity and said custom adapter device is provided with an extension that is configured to be fittingly received in said coin holder cavity.

8. A system for installing an interactive driver information system into an existing vehicle as recited in claim 2 wherein said pre-existing cavity is a seam in an instrument panel or a dash board of said vehicle and said custom adapter device is provided with an extension that is configured to be fittingly received in said seam.

9. A system for installing an interactive driver information system into an existing vehicle as recited in claim 2 wherein said PDA is integrated with a data phone and a driver input device and said electrical connection to said vehicle comprises: a connection to a power system of said vehicle, and a connection by way of a single cable to an on board controller that is integrated with a GPS antenna, a heading sensor, and a speaker.

10. A system for installing an interactive driver information system into an existing vehicle as recited in claim 2 wherein said PDA docking station is structurally integrated with a microphone, a speaker, and a panel of manually operable control elements to be manipulated by a driver, said docking station having a retaining device pivotally attached thereto for holding said PDA securely in position.

11. A system for installing an interactive driver information system into an existing vehicle as recited in claim 1 wherein said PDA docking station is structurally integrated with a microphone, a speaker, and a panel of manually operable control elements to be manipulated by a driver, said docking station having a retaining device pivotally attached thereto for holding said PDA securely in position.

12. A system as set forth in claim 1, wherein said electronic data communication is through an RF link to the vehicle.

13. A system as set forth in claim 1, wherein said electronic data link communicates with a vehicle computer.

14. A system for installing an interactive driver information system into an existing vehicle comprising:
   a PDA integrated with a data phone and a driver input device,
   a corresponding PDA docking station for mechanically and electrically receiving said integrated PDA,
   a custom adapter device for mechanically and electrically receiving said integrated PDA received in said docking station, said custom adapter device being configured to be fittingly received within a pre-existing cavity in said vehicle said custom adapter device creating and maintaining a mechanical connection from said integrated PDA received in said docking station to said vehicle, and
   said custom adapter device providing an electrical connection from said integrated PDA received in said docking station to a power system of said vehicle and by way of a single cable to an on board controller that is integrated with a GPS antenna, a heading sensor, and a speaker, such that said single cable creates and maintains a connection from said custom adapter device and said vehicle and provide both power and data connection to said custom adapter device.

15. A system for installing an interactive driver information system into an existing vehicle comprising:
   a PDA integrated with a data phone and a driver input device, a corresponding PDA docking station for mechanically and electrically receiving said integrated PDA,
   a custom adapter device for mechanically and electrically receiving said integrated PDA received in said docking station, said custom adapter device being configured to be fittingly received within a pre-existing cavity in said vehicle to create and maintain a mechanical connection from said integrated PDA received in said docking station to said vehicle, and providing an electronic data communication with said vehicle, and
   said PDA docking station is structurally integrated with a microphone, a speaker, and a panel of manually operable control elements to be manipulated by a driver, said docking station having a retaining device pivotally attached thereto for holding said PDA securely in position.

16. A system as set forth in claim 15, wherein said electronic data communication is through an RF link to the vehicle.

17. A system as set forth in claim 15, wherein said electronic data link communicates with a vehicle computer.

* * * * *